US007543552B2

(12) United States Patent
Clausen et al.

(10) Patent No.: US 7,543,552 B2
(45) Date of Patent: Jun. 9, 2009

(54) APPARATUS FOR STIMULATION AND ARTIFICIAL INSEMINATION OF ANIMALS

(75) Inventors: Morten Clausen, Vojens (DK); Steen Birkeland, Ribe (DK)

(73) Assignee: Agroinvent ApS, Ribe (DK)

( * ) Notice: Subject to any disclaimer, the term of this patent is extended or adjusted under 35 U.S.C. 154(b) by 94 days.

(21) Appl. No.: 11/795,672

(22) PCT Filed: Jan. 18, 2006

(86) PCT No.: PCT/DK2006/000028

§ 371 (c)(1), (2), (4) Date: Sep. 4, 2007

(87) PCT Pub. No.: WO2006/076918

PCT Pub. Date: Jul. 27, 2006

(65) Prior Publication Data

US 2008/0110137 A1 May 15, 2008

(30) Foreign Application Priority Data

Jan. 19, 2005 (DK) ............................... 2005 00095

(51) Int. Cl.
*A01K 21/00* (2006.01)
*A61D 19/02* (2006.01)

(52) U.S. Cl. ...................................... 119/858; 119/712

(58) Field of Classification Search ................. 119/858, 119/850, 712, 854, 174
See application file for complete search history.

(56) References Cited

U.S. PATENT DOCUMENTS

| | | | | |
|---|---|---|---|---|
| 4,338,402 | A * | 7/1982 | Suzuki | 435/307.1 |
| 5,690,060 | A * | 11/1997 | Dumoulin et al. | 119/858 |
| 6,116,193 | A | 9/2000 | Goeckner | |
| 6,669,682 | B1 * | 12/2003 | Gibson et al. | 604/890.1 |
| 2002/0017250 | A1 | 2/2002 | Cassou | |
| 2003/0069515 | A1 * | 4/2003 | Theelen et al. | 600/551 |
| 2007/0051325 | A1 * | 3/2007 | Gibson | 119/854 |

FOREIGN PATENT DOCUMENTS

| | | |
|---|---|---|
| DK | 171072 | 5/1996 |
| FR | 2720929 | 12/1995 |
| JP | 11/332411 | 12/1999 |
| NL | 1018988 | 6/2003 |
| WO | WO 93/02634 | 2/1993 |

* cited by examiner

*Primary Examiner*—Yvonne R. Abbott
(74) *Attorney, Agent, or Firm*—James Creighton Wray

(57) ABSTRACT

The present invention concerns an apparatus for stimulation of an animal for preparing and performing artificial insemination, the apparatus adapted for placing on a back part of the animal and provided with a holder for a container with semen and associated catheter, where the apparatus includes a frame (1), a number of rocker arms (4), at least one displacing unit (3), a number of pressing pads (2) and at least one valve arrangement (7), where the rocker arms (4) are connected to the displacing unit (3) and to the frame (1), where each of the rocker arms (4) are connected to the frame (1) and provided with at least one of the pressing pads (2), and where the valve arrangement (7) is adapted to control the displacing unit (3) for establishing a pulsating action on the animal with the pressing pads (2).

10 Claims, 2 Drawing Sheets

APPARATUS FOR STIMULATION AND ARTIFICIAL INSEMINATION OF ANIMALS

This application claims the benefit of Danish Application No. PA 2005 00095 filed Jan. 19, 2005 and PCT/DK2006/000028 filed Jan. 18, 2006, which are hereby incorporated by reference in their entirety.

FIELD OF THE INVENTION

The present invention concerns an apparatus for stimulation of an animal for preparing and performing artificial insemination, the apparatus including a saddle-shaped device for placing on a back part of the animal and provided with a holder for a container with semen and associated catheter.

BACKGROUND OF THE INVENTION

From DK 171 072, for example, it is prior art to make brackets for fastening on the back of the animal on which semen bags and associated catheter for insemination can be suspended.

The drawbacks of the above mentioned prior art methods is that stimulation during preparation and subsequent stimulation during the insemination itself is performed manually by trained personnel. The work with stimulating many animals in a daily routine is physically demanding on the personnel, why varying quality of the performed work occurs. Under the stimulation itself, by manual stimulation it is required that the personnel stands bent in over the animal, acting physically on the animal around the groin in order to make the animal release hormonal substances enabling insemination. This also entails that the personnel has difficulty in preparing and inseminating more than two animals at the same time, why the cost of the work is considerable. It is also a drawback by the prior art methods that a longer training period is required for the personnel.

In order to establish such a stimulation during preparation and insemination, there is proposed further developed constructions. From U.S. Pat. No. 6,116,193 there is known an insemination saddle for sows and gilts for use in artificial fertilization. The saddle includes two straps and a vibrator connected with the straps which via the straps transmits vibrations to the animal. A first strap is disposed around the animal's flank and belly for transmitting vibrations to the animal, and the second strap is connected with a catheter inserted in the uterus of the sow for transmitting vibrations to the catheter. The first strap transmits a vibration along the length of the strap, which may be an annularly extending length providing an evenly distributed vibrational action on flanks, belly and back.

OBJECT OF THE INVENTION

A first object of the present invention is to indicate an apparatus which reduces the physical as well as the time workload for the person performing insemination.

A second purpose of the present invention is to indicate an apparatus reducing the risk of understimulating the animal so that there is possibility of a greater yield in the form of more offspring per insemination and higher fertilization percentage.

A third object of the present invention is to indicate an apparatus imitating the actions on the animal which appear by natural transmission of semen.

DESCRIPTION OF THE INVENTION

This is achieved by means of an apparatus as specified in the preamble of claim 1, and where the apparatus includes a saddle-shaped frame, a number of rocker arms, at least one displacing unit, a number of pressing pads and at least one valve arrangement, where the rocker arms are connected to the displacing unit and to the frame, where each of the rocker arms are connected to the frame and provided with at least one of the pressing pads, and where the valve arrangement is adapted to control the displacing unit for establishing a pulsating action on the animal with the pressing pads.

The invention thus concerns an apparatus for stimulating and inseminating e.g. sows in a pig herd by mounting the apparatus on the back of the animal. The saddle-shaped frame of the apparatus has a shape adapted to the animal's back. The displacement unit may be activated as there is mounted an electronic control unit at the top of the saddle, transmitting a signal to the valve arrangement so that this may actuate the displacing unit which is preferably provided as a pneumatic cylinder. This displacing unit makes the frame tighten around the animal's inguinal section with rhythmical movements which can be varied in frequency and speed through the control of the opening and closing of valves in the valve arrangement.

Stimulation of the animal via rocker arms and the pressing pads mounted thereon is performed. A well-defined stimulation may thereby be provided by bringing the frame to tighten around the groin of the sow by means of the pressing pads. Thereby the male's natural prods and pressure during a mating course for the animal is simulated, in order thereby to prepare the animal for artificial insemination and continuously stimulate during the insemination itself. The personnel responsible for insemination of the animals may therefore prepare and inseminate more animals at a time.

In the following it is described how an apparatus according to the present invention may be used for inseminating sows and/or young pigs. However, it is to be remarked that within the frame of this invention it would be desirable and obvious for the skilled in the art to use the apparatus for stimulating other animal species, e.g. cattle, horses, sheep, goats, dogs and/or cats.

SHORT DESCRIPTION OF THE DRAWING

The invention will then be explained in more detail with reference to the accompanying drawing, where FIG. 1 shows an apparatus according to the invention viewed from the end;

DETAILED DESCRIPTION OF THE INVENTION

In the following, a possible embodiment of the apparatus according to the present invention is described in more detail with basis in a preferred embodiment.

Figure 1:
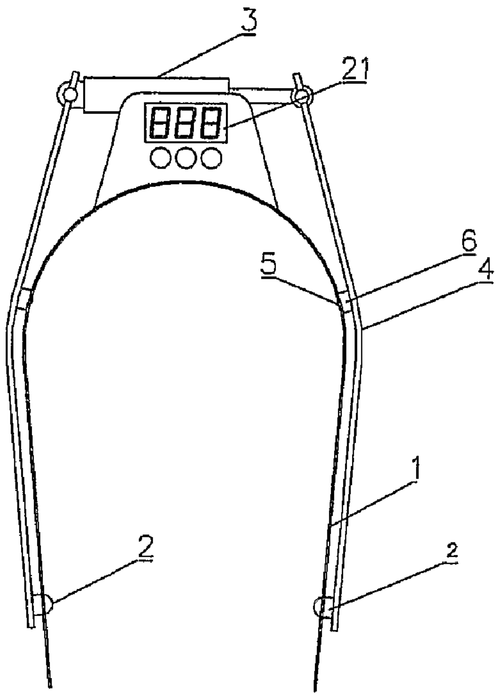
Figure 2:
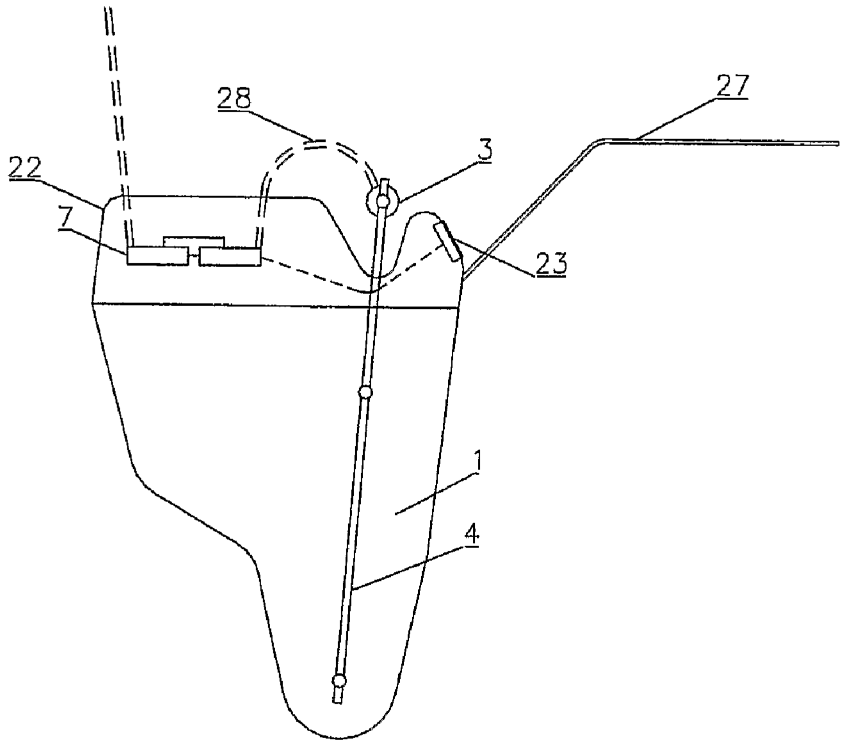
FIG. 2 shows the apparatus viewed from the side.

By an apparatus according to FIGS. 1 and 2, sows are stimulated in such a way that necessary hormones in connection with artificial insemination are released in the sows, as the saddle-shaped frame 1 is brought to tighten around the sow's groin by means of two pressing pads 2 designed for this purpose. The saddle-shaped frame 1 is brought to squeeze by means of the cylinder 3 which are mechanically connected to two rocker arms 4. The rocker arms 4 are fastened to the saddle-shaped frame 1 with usual screws or other usual fastening methods 5 with four flexible joints 6 of known kind, where the joints 6 are designed to fit to the fastening method, e.g. the thread of the screws 5. The cylinder 3 is connected to a valve arrangement 7 (see FIG. 2) which is described in more detail in the following with reference to FIG. 3.

Figure 3:
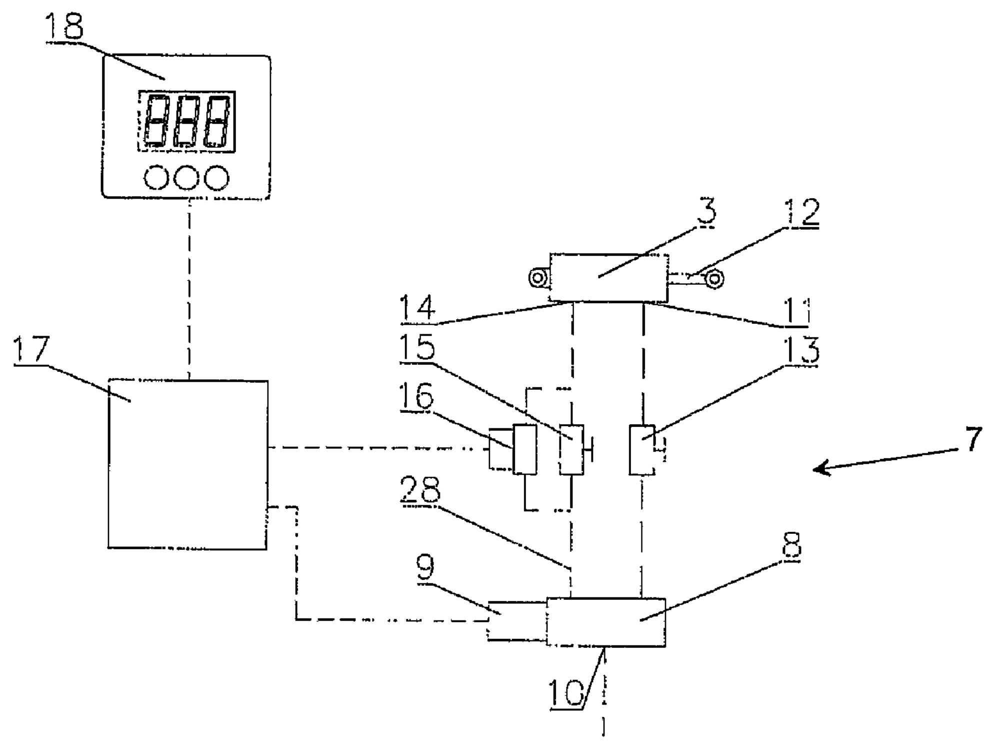
FIG. 3 shows schematically a construction of a valve mechanism.

The valve arrangement according to FIG. 3 consists of a five-way valve 8 of known kind, the position of which being controlled by an electric voltage on the solenoid 9. When the solenoid 9 is de-energized, the solenoid valve 8 is in initial position and open for through-flow from the inlet side 10 to the connection 11 on the cylinder 3 which brings the piston 12 into the position where the cylinder 3 is shortest, hereafter called opened. Between the inlet side 10 and connection 11 on the cylinder, a manual throttle device 13 of known kind is inserted, with which the opening speed of the movement of the cylinder 3 can be regulated in relation to desired speed.

When the solenoid 9 is live, the solenoid valve 8 is in active position and open for through-flow from the inlet side 10 to the connection 14 on the cylinder 3 which brings the piston 12 into the position where the cylinder 3 is longest, hereafter called closed. Between the inlet side 10 and connection 14 on the cylinder, a manual throttle device 15 of prior art is inserted, with which the closing speed of the movement of the cylinder 3 can be regulated in relation to desired speed. Furthermore, in parallel with the inlet side 10 and connection 14 on the cylinder, there is inserted a solenoid valve 16 of known kind, with which the throttle device 15 may be bypassed for achieving maximum closing speed for producing rapid closing pulses.

All components in the valve arrangement 7 are mutually connected with a flexible tube 28 of known kind. The solenoid valves 8 and 16 are electrically connected to the control circuit 17 which includes a microprocessor for controlling the movements of the apparatus and an operating unit 18 according to FIG. 4, consisting of the keys 24, 25 and 26, display 20 and protective film 21. The valve arrangement according to FIG. 3 and the control circuit 17 are disposed under a protective shell 22 (see FIG. 2) in such a way that the operating unit 18 is led through the shell 22 at its inclining front side 23, and on which the film 21 is bonded with double-adhesive tape. The shell 22 is fastened to the saddle-shaped frame 1 by means of screws of known kind.

In a second possible embodiment, the valve arrangement is designed as a combined unit so that all functions are integrated in the unit. This embodiment is advantageous by large quantities, as the production cost may be reduced thereby. The drawbacks are that the valve block is to be made specifically for the product according to the invention.

In a third possible embodiment, the pressing pads 2 are designed so that their spacing from the saddle 1 may be adjusted by means of an adjusting unit adapted therefore, in order thereby and according to need to enable adjusting the apparatus according to the invention to the sizes of different animals.

In a fourth possible embodiment, the valve arrangement and the cylinder 3 are replaced by a linear motor of known design. The electronic control circuit 17 is thus adapted to control the movement of the linear motor with respect to the intended function of the apparatus. The advantage hereby is that no external drive medium source is required.

In a fifth possible embodiment, the power supply unit is integrated in the apparatus so that an external power source is no longer required. Thereby is achieved that the apparatus is more flexible with regard to the place of use.

In the following, the mode of operation of the apparatus according to the invention is described in more detail with basis in a preferred embodiment.

Figure 4:
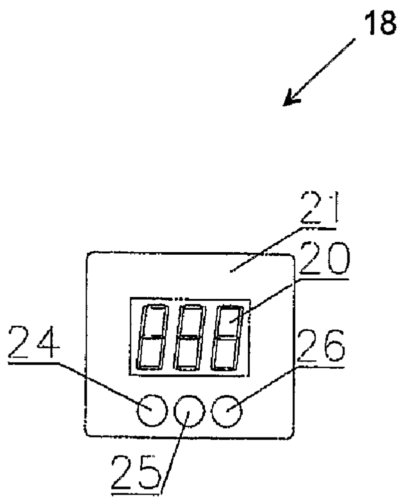
FIG. 4 shows an operating unit.

The operating unit 18 of the apparatus according to FIG. 4 is electrically connected to the control circuit 17, so that its program parameters can be changed for optimizing the function of the apparatus.

The operating unit 18 of the apparatus has three keys. The first key 24 is used for selecting a higher value, the second key 25 is used for selecting a lower value, and the third key 26 is used for selecting the parameter to be changed.

When no key is activated, normal program status is displayed, which is "0" for stopped program, "P1" for the first program step and "P2" for the second program step.

When the key 26 is depressed, the actual selected program number is displayed. Program number "0" is stopped, program number "1" is preparation step and program number "2" is insemination step.

When key 26 is kept depressed, and key 24 or key 25 are depressed at the same time, the value will be increased or reduced, respectively, for selecting another program number. When the keys are released, the program flow in the control circuit 17 is activated.

If the basic settings in the control circuit 17 are desired changed, access to the basic settings is achieved by holding key 24 and key 25 depressed simultaneously for three seconds, after which the first basic setting designation "E0" is displayed. The value of setting "E0" is displayed by holding the key 26 depressed.

When key 26 is kept depressed, and key 24 or key 25 are depressed at the same time, the value will be increased or reduced, respectively, for selecting another basic setting. If key 24 or key 25 are pressed, there is shifted to next menu designated "E1" etc. or previous menu point, respectively, after which the value of this point can be seen or changed in the same way as for the point "E0". If a key is not pressed for one minute, the basic setting menu will be left, and normal program status is displayed again.

In the program, for each of the program steps "P1" and "P2", time settings for the duration of the step (0-200 s), typically 60 s, the ratio between open and closed condition of the apparatus (0-100%), typically 50%, time for rapid pulses (1-10 s), typically 2 s, frequency of rapid pulses (0-100%), typically 30%, and the rate time for normal pulses (1-10 s), typically 2 s.

The apparatus is started by initiating the program via the operating unit 18 as described above. The control circuit 17 will now activate solenoid valve 8, whereby the cylinder 3 of the apparatus brings the apparatus to the position closed. Depending on the selected basic settings, after a short moment corresponding to the selected rate time and the ratio between open and closed, the program will de-energize solenoid valve 8, after which the apparatus is again brought into the position open. This pulsation continues until the time for the duration of the step is run out.

The random generator integrated in the program with provide for activating rapid pulses compared to normal pulses as indicated in the frequency of quick pulses. During quick pulses, solenoid valve 16, in addition to solenoid valve 8, is activated which will ensure that the drive medium is directed around throttle valve 15 so that as rapid pulses as possible may be attained.

When the programmed time of a step is run out, the control will continue in the next step, and when the control has run through all steps, it will stop if not terminated manually before.

The apparatus according to claims 1, 2 and 3 operates in that the apparatus is placed down upon the back of the sow to be treated, after which the apparatus is connected to a voltage supply and a drive medium source of commonly known art. When the program of the apparatus is activated, the opening and closing movements of the apparatus will simulate the prods and lifts of the boar, after which the sow will react by releasing hormones and be susceptible to semen via insemination. When the apparatus has completed step 1 and commences step 2, a semen bag is suspended on the holder 27 and a catheter is passed into the vaginal opening on the sow, whereby the semen can run into the uterus of the sow for fertilization. Stimulation continues until the semen bag is empty, after which the apparatus may be removed from the sow and the process is finished.

The invention claimed is:

1. Apparatus for stimulation of an animal for preparing and performing artificial insemination, the apparatus including a saddle-shaped device for placing on a back part of the animal and provided with a holder for a container with semen and associated catheter, wherein the apparatus includes a saddle-shaped frame (1), a number of rocker arms (4), at least one displacing unit (3), a number of pressing pads (2) and at least one valve arrangement (7), where the rocker arms (4) are connected to the displacing unit (3) and to the frame (1), where each of the rocker arms (4) are connected to the frame (1) and provided with at least one of the pressing pads (2), and where the valve arrangement (7) is adapted to control the displacing unit (3) for establishing a pulsating action on the animal with the pressing pads (2).

2. Apparatus according to claim 1, wherein the valve arrangement (7) includes a number of magnet valves (8, 16) and a number of throttle devices (13, 15) that are mutually connected with a number of tubes (28).

3. Apparatus according to claim 1, wherein a first magnet valve (8) is connected to a first throttle device (13) which is connected with the cylinder (3), that the first electromagnetic valve (8) is connected with a parallel arrangement including a second throttle device (15) and a second electromagnetic valve (16), and which is connected with the cylinder (3).

4. Apparatus according to claim 1, wherein it furthermore includes an electronic control circuit (17) including at least one microprocessor and which is electrically connected to the electromagnetic valves (8, 16).

5. Apparatus according to claim 4, further including an operating unit (18) which is electrically connected to the electronic control circuit (17).

6. Apparatus according to claim 1, wherein it furthermore includes a power supply unit.

7. Apparatus according to claim 1, wherein the at least one displacing unit (3) is one or more of the following:

pneumatic cylinders hydraulic cylinders linear displacement motors.

8. Apparatus according to claim 1, wherein the pressing pads (2) are detachably and adjustably fastened to the rocker arms (4).

9. Apparatus according to claim 1, wherein the frame is saddle-shaped and made of a flexible material.

10. Apparatus according to claim 1, wherein each of the rocker arms (4) are connected to the frame (1) with at least one flexible joint (6).

* * * * *